United States Patent
Engel et al.

(10) Patent No.: US 12,043,257 B2
(45) Date of Patent: Jul. 23, 2024

(54) DETERMINING A DISCRETE REPRESENTATION OF A ROADWAY SECTION IN FRONT OF A VEHICLE

(71) Applicant: ZF Friedrichshafen AG, Friedrichshafen (DE)

(72) Inventors: Valerie Engel, Markdorf (DE); Andreas Wendzel, Grünkraut (DE); Maik Dreher, Tettnang (DE); Timon Busse, Munich (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 255 days.

(21) Appl. No.: 17/776,927

(22) PCT Filed: Nov. 14, 2019

(86) PCT No.: PCT/EP2019/081331
§ 371 (c)(1),
(2) Date: May 13, 2022

(87) PCT Pub. No.: WO2021/093955
PCT Pub. Date: May 20, 2021

(65) Prior Publication Data
US 2022/0402489 A1 Dec. 22, 2022

(51) Int. Cl.
*B60W 30/14* (2006.01)
*B60W 30/045* (2012.01)
*B60W 50/06* (2006.01)

(52) U.S. Cl.
CPC ........ *B60W 30/146* (2013.01); *B60W 30/045* (2013.01); *B60W 50/06* (2013.01);
(Continued)

(58) Field of Classification Search
CPC .. B60W 30/146; B60W 30/045; B60W 50/06; B60W 2552/15; B60W 2552/45;
(Continued)

(56) References Cited

U.S. PATENT DOCUMENTS

| 8,548,683 B2 * | 10/2013 | Cebon | B62D 7/159 |
| | | | 701/42 |
| 2015/0224845 A1 * | 8/2015 | Anderson | F03G 7/08 |
| | | | 701/37 |

(Continued)

FOREIGN PATENT DOCUMENTS

| DE | 102009000397 A1 | 7/2010 |
| DE | 102015202216 A1 | 3/2016 |
| WO | WO 2010/083910 | 7/2010 |

OTHER PUBLICATIONS

International Search Report (English Translation) PCT/EP2019/081331, dated Jul. 1, 2020. (2 pages).
(Continued)

Primary Examiner — Behrang Badii
(74) Attorney, Agent, or Firm — Dority & Manning, P.A.

(57) ABSTRACT

A device (16) for determining a discrete representation (30) of a road section ahead of a vehicle (12) includes an input interface (22) for receiving sensor data (20) of a sensor (14) with information about the road section ahead of the vehicle, a setting unit (24) for ascertaining a control distance at which a property of the road section ahead of the vehicle that is relevant for an open-loop control of the vehicle changes based on the sensor data and for setting a support point in a discrete representation of the road section corresponding to the control distance. The setting unit is configured for setting a lower predefined second number (n2) of support points based on a predefined first number (n1) of support points. The device also includes an output interface (26) for outputting the lower predefined second number of support
(Continued)

points to an optimizer (52) in order to determine a profile of at least one control parameter for the open-loop control of an open-loop system, a vehicle function based on the second number (n2) of support points.

14 Claims, 4 Drawing Sheets

(52) U.S. Cl.
CPC ..... *B60W 2552/15* (2020.02); *B60W 2552/45* (2020.02); *B60W 2552/53* (2020.02); *B60W 2554/20* (2020.02); *B60W 2555/60* (2020.02); *B60W 2556/45* (2020.02); *B60W 2720/103* (2013.01)

(58) Field of Classification Search
CPC ......... B60W 2552/53; B60W 2554/20; B60W 2555/60; B60W 2556/45; B60W 2720/103; B60W 2552/00; B60W 2552/20; B60W 2552/30; B60W 2710/20; B60W 2720/10; B60W 2720/106; B60W 50/0097; B60W 2554/80; B60W 2554/802

See application file for complete search history.

(56) References Cited

U.S. PATENT DOCUMENTS

| | | |
|---|---|---|
| 2016/0082947 A1 | 3/2016 | Naumann et al. |
| 2017/0038777 A1* | 2/2017 | Harvey ................. G05D 1/0027 |
| 2017/0341660 A1 | 11/2017 | Jang et al. |
| 2019/0339687 A1* | 11/2019 | Cella .......................... H04L 1/18 |
| 2020/0348662 A1* | 11/2020 | Cella ................ G05B 19/41865 |
| 2021/0110089 A1* | 4/2021 | Chen ..................... G06T 7/0004 |
| 2021/0122045 A1* | 4/2021 | Handa ....................... G06T 7/74 |
| 2021/0157312 A1* | 5/2021 | Cella ................... G01M 13/045 |

OTHER PUBLICATIONS

Attia, Rachid et al. "Reference Generation and Control Strategy for Automated Vehicle Guidance", Intelligent Vehicles Symposium (JV), Madrid, Spain, 2012 IEEE, pp. 389-394 DOI: 10.1 109/IVS. 2012.6232248, ISBN: 978-1-4673-2119-8. XP032453039 pp. 391-393; figure 5.

* cited by examiner

DETERMINING A DISCRETE REPRESENTATION OF A ROADWAY SECTION IN FRONT OF A VEHICLE

CROSS-REFERENCE TO RELATED APPLICATION

The present application is a U.S. national phase of PCT/EP2019/081331 filed in the European Patent Office on Nov. 14, 2019, which is incorporated by reference in its entirety for all purposes.

FIELD OF THE INVENTION

The present invention relates generally to a device for determining a discrete representation of a road section ahead of a vehicle.

BACKGROUND

Modern vehicles (automobiles, transporters, trucks, motorcycles, etc.) include a plurality of systems that provide information to the driver and control individual functions of the vehicle in a semi-automated or fully automated manner. The surroundings of the vehicle as well as other road users are detected using sensors. Based on the gathered data, a model of the vehicle surroundings can be generated and changes in these vehicle surroundings can be responded to. Due to the progressive development in the area of autonomously and semi-autonomously driving vehicles, the influence and the effective range of such driver assistance systems (advanced driver assistance systems, ADAS) are becoming greater and greater. Due to the development of increasingly more precise sensors, it is possible to detect the surroundings and the traffic and completely or partially control individual functions of the vehicle without any intervention by the driver. Driver assistance systems can contribute, in particular, to increasing safety in traffic and improving ride comfort.

In addition to the detection and recognition of static objects in the surroundings of the host vehicle by surroundings sensors, such as, for example, camera sensors, radar sensors, LIDAR sensors, or ultrasonic sensors, moving objects and other road users can also be detected. On the basis thereof, for example, a behavior of an autonomous or semi-autonomous vehicle can be adapted to a current situation.

For the open-loop control of an autonomous and/or semi-autonomous vehicle, it is necessary to know multiple control parameters for a road section situated ahead of the vehicle. For this purpose, an evaluation of a large volume of data is necessary, which results in a high computational complexity, in particular due to the short time in which the control parameter must be determined. For example, it is known to model and/or scan and process the road section ahead of a vehicle in discrete steps having a constant spacing. As the number of steps increases, so does, on the one hand, the time and the length ahead of the vehicle, in which looking into the future takes place, i.e., in which the control parameter for the future autonomous driving is known. On the other hand, the computational complexity for determining the control parameter profile also increases with each of these detected spacing points.

Against this background, a person skilled in the art is faced with the problem of more efficient modeling of a road section ahead of a vehicle. In particular, all relevant properties of the road section are to be detected that are necessary for modeling a control parameter for the open-loop control of a, preferably autonomously driving, vehicle.

SUMMARY OF THE INVENTION

Example aspects of the present invention provide a device for determining a discrete representation of a road section ahead of a vehicle, including:
- an input interface for receiving sensor data of a sensor including information about the road section ahead of the vehicle;
- a setting unit for ascertaining a control distance at which a property of the road section ahead of the vehicle that is relevant for an open-loop control of the vehicle changes, based on the sensor data, and for setting a support point in a discrete representation of the road section, which corresponds to the control distance, wherein the setting unit is configured for setting a lower predefined second number of support points based on a predefined first number of support points; and
- an output interface for outputting the lower predefined second number of support points to an optimizer in order to determine a profile of at least one control parameter for the open-loop control of a vehicle function based on the second number of support points.

Moreover, example aspects of the present invention provide a system for determining a discrete representation of a road section ahead of a vehicle, including:
- a sensor for generating sensor data including information about a road section ahead of the vehicle;
- a device as defined above;
- an optimizer for determining a profile of at least one control parameter for the open-loop control of a vehicle function based on the support points in the discrete representation; and
- a vehicle control unit for the open-loop control of at least one vehicle function based on a control parameter profile determined by the optimizer.

In addition, example aspects of the present invention provide a method for determining a discrete representation of a road section ahead of a vehicle, including:
- receiving sensor data of a sensor including information about the road section ahead of the vehicle;
- ascertaining a control distance at which a property of the road section ahead of the vehicle that is relevant for an open-loop control of the vehicle changes, based on the sensor data;
- setting a support point in a discrete representation of the road section, which corresponds to the control distance, wherein a support point is set based on a predefined first number of support points and a lower predefined second number of support points; and
- outputting the lower predefined second number of support points to an optimizer in order to determine a profile of at least one control parameter for the open-loop control of a vehicle function based on the second number of support points.

Further example aspects of the invention relate to a corresponding computer program product including program code for carrying out the steps of the method when the program code is run on a computer, and a memory medium on which a computer program is stored, which, when run on a computer, causes the method described herein to be carried out.

It is understood that the features, which are mentioned above and which will be described in greater detail in the following, are usable not only in the particular combination indicated, but rather also in other combinations or alone, without departing from the scope of the present invention. In particular, the system, the method, and the computer program product can be configured according to the example embodiments described for the device and the system.

Due to the input interface for receiving sensor data, the device can be technically easily incorporated into an already existing sensor system of a, preferably autonomously driving, vehicle. It is understood that sensor data can include both raw data of a sensor as well as already processed data of a sensor. In particular, it can be provided that the sensor data already include a discrete representation including support points at constant distances. By the setting unit, it can be technically easily ensured that, in a reduced set of support points, all properties of the road section ahead of the vehicle that are relevant for the open-loop control of the vehicle are detected and processed. Due to the fact that the setting unit is configured for setting a lower predefined second number of support points based on a predefined first number of support points, a reduced set of support points can be created for an optimizer. In this way, it can be reliably ensured that the determination of a profile of at least one control parameter can be carried out with less computational complexity. The lower second number of support points can be output to an optimizer by the output interface. As a result, by the device, a discrete representation of a road section ahead of the vehicle having a lower number of support points can be technically easily created and transmitted for further processing.

In one preferred example embodiment, the setting unit is configured for setting a support point in the representation for a control distance at which the property that is relevant for an open-loop control of the vehicle includes a discrete event. Additionally or alternatively, the setting unit is configured for setting multiple support points having a predefined maximum point spacing in the discrete representation for control distances at which the property that is relevant for an open-loop control of the vehicle includes a continuous event. Examples of a discrete event are changes of speed limits, traffic control signs such as traffic lights, other road users, and/or a change of the permitted maximum speed, preferably due to traffic signs. Due to the setting of at least one support point in the discrete representation, it can be technically easily ensured that the relevant property for the open-loop control of the vehicle is detected in the discrete representation. Moreover, due to the setting of only one support point, the number of support points in the discrete representation can be kept low. Examples of a continuous event are uphill grades in the roadway and curves. Due to the setting of multiple support points with a predefined maximum point spacing, the continuous profile of the continuous event can be represented with sufficient accuracy. The predefined maximum point spacing can vary with the complexity of the continuous event. In particular, the predefined maximum point spacing is to be selected in such a way that an optimizer can model the profile of a control parameter at least with sufficient accuracy.

In one advantageous example embodiment, the input interface is configured for receiving map data from an onboard computer and/or an external system, wherein the map data include information about curves, uphill grades, speed limits, environmental zones, tunnels, and/or stops on the road section. As a result, the device can more efficiently and quickly arrive at a result, since a comparison with the stored map material is all that is necessary. Moreover, it is conceivable to utilize a simpler and more cost-effective setting unit for a comparison.

In one advantageous example embodiment, the setting unit is configured for setting support points that are situated closer to the vehicle in the discrete representation with a smaller point spacing than is the case for more distant support points. As a result, it can be achieved, in particular, that the discrete representation corresponds to a sufficiently far road section ahead of the vehicle, wherein a profile of a control parameter for the open-loop control of the vehicle in the near future is more precisely formable. In particular since more support points have been set in order to form the profile of a control parameter.

In one advantageous example embodiment, the setting unit is configured for setting a first support point at the location of an originating point of the discrete representation and setting one further support point at an end point of the discrete representation. The originating point of the discrete representation corresponds to the current vehicle position. By setting a support point at an originating point that corresponds to the current vehicle position, and at an end point that corresponds to an end of the road section ahead of the vehicle, it can be technically easily ensured that a formation of the control parameter for the relevant range will be carried out.

In one advantageous example embodiment, the setting unit is configured for setting a support point at each control distance at which the property that is relevant for the open-loop control of the vehicle includes a change of the speed limit. Likewise, a support point can be set at a control distance at which the property includes a static traffic element, preferably a traffic light, a traffic sign, an intersection, and/or a preceding object. In addition, a support point can be set at a control distance at which the property includes a pedestrian crossing, a tunnel, an underpass, and/or a stop. Due to the setting of further support points at the aforementioned locations, it can be technically easily ensured that information that is relevant for the open-loop control and road safety is taken into account during a formation and/or during the modeling of a profile of a control parameter for a, preferably autonomously driving, vehicle. The safety in traffic is increased.

In one further advantageous example embodiment, the setting unit is configured for determining a predefined maximum cornering speed. Additionally, the setting unit is configured for ascertaining, from a quantity of support points of the discrete representation, the support points, the maximum cornering speed of which is lower due to a curve curvature than the maximum permitted speed due to traffic rules. The setting unit is also configured for discarding all support points from the quantity of support points except for a support point, the maximum cornering speed of which is minimal. The maximum cornering speed is preferably predefined by a limitation due to the maximum lateral acceleration. In particular, further information, such as the weather and/or the road surface, can also be taken into account. Due to the above-described design of the setting unit, it can be technically easily ensured that a safe cornering speed is maintained during the modeling of the profile of at least one control parameter for the open-loop control of a preferably autonomously driving vehicle. It is further advantageous that the number of necessary support points is kept low.

In one further advantageous example embodiment, the setting unit is configured for performing one further pass for setting support points and, based on the predefined second number of support points, setting further support points and/or discarding support points. As a result, it can be technically easily ensured that a predetermined discrete number of support points is set in the discrete representation. As a result, in particular, the formation of the at least one control parameter that is relevant for the open-loop control of the vehicle can be carried out quickly and reliably. Moreover, an improvement of the discrete representation can take place in a second pass.

In one further advantageous example embodiment, the setting unit is configured for ascertaining, at each support point from the first number of support points, both the uphill grade as well as the altitude at this support point. The setting unit is configured for investigating each support point from the first number of support points step-by-step in ascending order. Additionally, the setting unit is configured for storing the uphill grade and altitude at a support point when this support point from the second number of support points has already been set in the discrete representation. The setting unit is also configured for setting a support point of the second number of support points in the discrete representation and storing an altitude and uphill grade at this support point when a deviation between a most recently stored uphill grade at a support point from the first number of support points is greater than a predefined threshold or when a deviation between a most recently stored altitude and a current altitude at a support point from the first number of support points is greater than a further predefined threshold. As a result, a formation of the at least one control parameter that is necessary for the open-loop control of an autonomously driving vehicle with respect to a continuous profile of properties can be technically easily achieved. In particular, it can be ensured that there are no jumps in the discrete representation that, in particular, are greater than a predefined threshold. The formation of a control parameter profile can be carried out quickly and efficiently in this way.

In one further advantageous example embodiment, the setting unit is configured for setting the support points in a predefined maximum point spacing, which is preferably defined depending on a distance of the support points to the vehicle. The setting unit is also configured for setting a new support point in the center between an already existing first support point and second support point or, starting from a first support point, setting a new support point with the predefined maximum point spacing. As a result, it can be ensured that the individual support points have a sufficiently small spacing to enable an optimal formation of the at least one control parameter on the basis of the support points.

In one further advantageous example embodiment, the setting unit is configured in such a way that, when all support points from the second number of support points have been set, the setting unit compares a distance of the support point currently to be set from the vehicle with a distance of the support point farthest away from the vehicle and, of the two support points, setting the support point having the shorter distance to the vehicle. As a result, it can be technically easily and reliably ensured that the predefined second number of support points is not exceeded. Moreover, it is ensured in this way that all information necessary for modeling at least one control parameter is present in the discrete representation. It is understood that, as a result, the road section that the discrete representation represents can be shorter.

In one further advantageous example embodiment, the setting unit is configured in such a way that, when further support points from the second number of support points can be assigned, the setting unit sets one further support point in the discrete representation before and/or after a control distance at which the property that is relevant for an open-loop control of the vehicle includes a discrete event. As a result, it can be technically easily ensured that the predefined second number of support points is maintained. Due to the setting before or after a discrete event, a more precise formation of the profile of the at least one control parameter can be carried out. Preferably no additional information is represented due to the additional support points. For example, a reduction of a maximum speed can occur, preferably announced by a traffic sign. Due to a provision of at least one additional support point in the discrete representation before the speed reduction, the optimizer can select a speed at this point and, as a result, more precisely form the profile of the reduction. As a result, in particular, the safety and the ride comfort can be increased, since no abrupt changes of a control parameter, as in this example of the speed, take place.

Possible control parameters for the open-loop control of a vehicle can include, in particular, a steering angle, a speed, and/or an acceleration. Moreover, a state of charge of the battery can be taken into account, in particular, for a hybrid vehicle and/or a purely electric vehicle. In addition, a control parameter can also include a gear step of a transmission of the vehicle.

A discrete representation is understood to be a digital model or a digital image of a real road section ahead of a vehicle. A support point in the discrete representation corresponds to a control distance on the real road section. Further parameters, such as, for example, an uphill grade of the road at the support point/control distance, a permitted and/or calculated speed, a traffic rule, etc., can be stored for a support point. In this way, a depiction of the road section can be created, which preferably has all relevant information of the road section.

An optimizer determines a profile of a control parameter for a vehicle function on the basis of the support points and building upon predefined or establishable optimization criteria. Optimization criteria can be, in particular, the energy consumption, the passenger comfort, and safety. For example, a continuous profile of a control parameter can be determined on the basis of the discrete support points via interpolation between the support points.

A vehicle function is, in particular, an implementable open-loop control of the vehicle, which is preferably carried out on the basis of a control parameter. Vehicle functions can include, for example, a steering angle, an acceleration, and/or a brake application. It is understood that a vehicle function can include a control circuit for the closed-loop control of a vehicle control on the basis of a control parameter, wherein the control parameter preferably includes variables such as a speed, a trajectory, and the like.

A continuous event describes a road property that changes monotonously, such as a curvature of a curve or an uphill grade of the road. A discrete event describes a road property that changes abruptly from one state to another state, such as, for example, a permitted maximum speed or the changing of a traffic light.

BRIEF DESCRIPTION OF THE DRAWINGS

Aspects of invention are described and explained in greater detail in the following with reference to a few selected exemplary embodiments in conjunction with the attached drawings, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
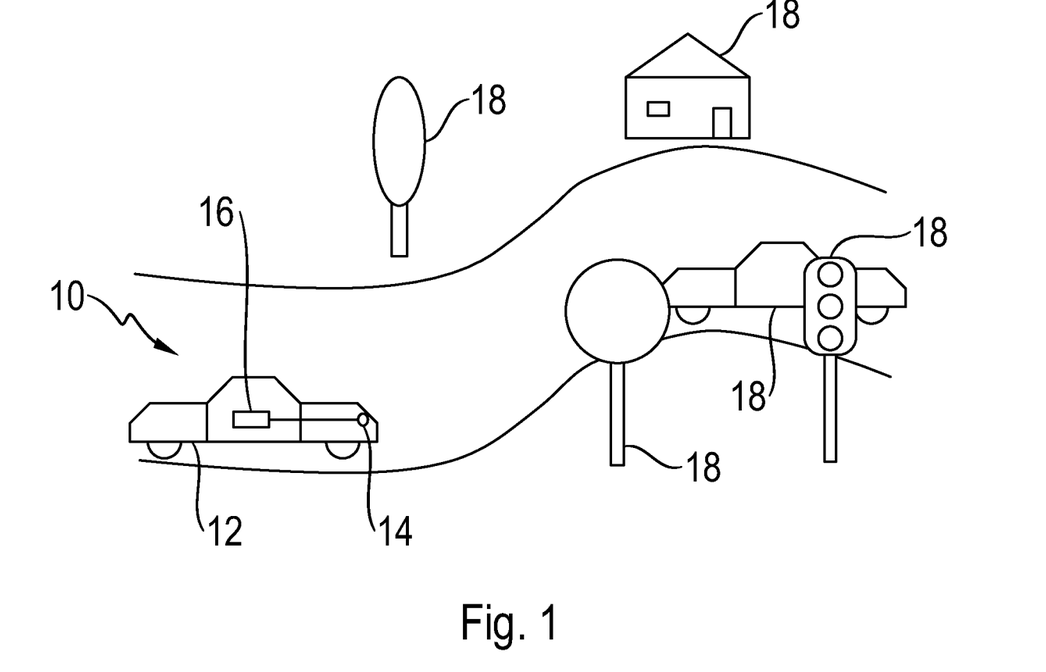
FIG. 1 shows a schematic of a situation in traffic with a vehicle having a device according to example aspects of the invention.

FIG. 1 diagrammatically shows a system 10 for determining a discrete representation of a road section ahead of a vehicle 12. The system 10 detects a road section ahead of the vehicle 12 by a sensor 14. The system 10 includes a device 16 for determining a discrete representation of a road section ahead of the vehicle 12, and the sensor 14. In the exemplary embodiment represented, the device 16 and the sensor 14 are integrated into the vehicle 12. It is understood that it is also conceivable that the device 16 and/or the sensor 14 are/is designed separately.

As represented in FIG. 1, different objects 18, such as, for example, other road users, in particular vehicles, or also static objects, such as trees, houses, traffic signs, traffic lights, or the like, can be detected. The sensor 14 can be, in particular, a radar or LIDAR sensor and/or a camera.

In example aspects of the invention, a discrete representation of a road section ahead of the vehicle 12 is created based on the sensor data. For this purpose, for example, an automatic sign recognition and traffic sign recognition can be carried out. Moreover, a profile of the road can be ascertained. In particular, a parameter in the sensor data can be detected, which is indicated on an absolute and/or relative scale. In addition, the parameter can be multi-dimensional.

A setting unit of the device 16 can ascertain, from the sensor data, a control distance at which at least one property of the road section ahead of the vehicle 12 that is relevant for an open-loop control of the vehicle 12 changes and, based thereon, set a support point in the discrete representation. It is understood that the sensor 14 can be configured for already preprocessing the sensor data. In particular, it can be provided that the sensor already creates a digital representation in which, for example, support points are provided in a constant discrete spacing.

By the system 10, a discrete representation can be created, which has a predefined fixed number of support points. As a result, an optimizer can better form a profile of a control parameter for the open-loop control of at least one vehicle function. In particular, an essentially homogeneous profile, i.e., without abrupt changes, can be formed. As a result, on the one hand, the comfort of the ride can be improved. On the other hand, as a result, driving can take place in an energy-efficient manner, since, in particular, unnecessarily fast and energy-inefficient acceleration processes can be avoided.

Figure 2:
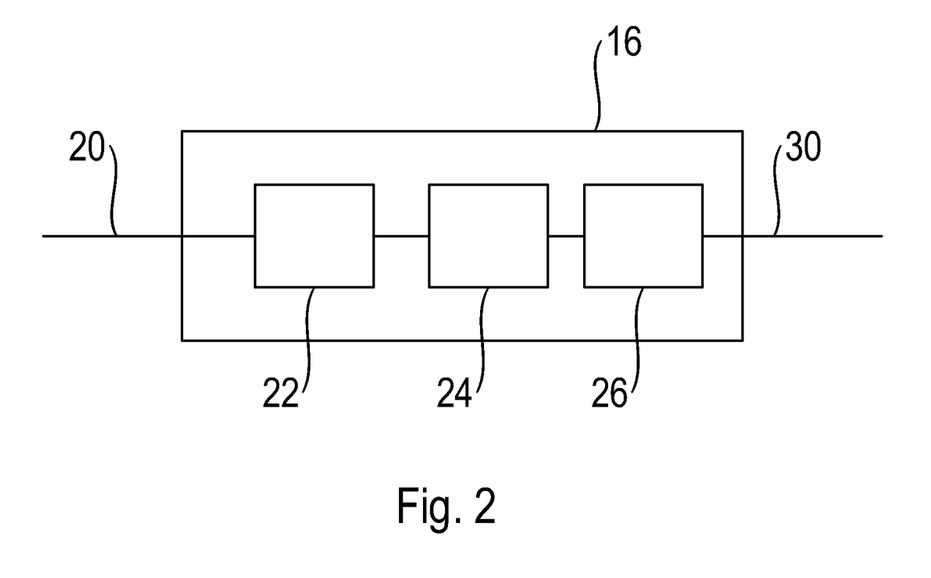
FIG. 2 shows a schematic of a device according to example aspects of the invention.

A device 16 according to example aspects of the invention is diagrammatically represented in FIG. 2. The device 16 receives sensor data 20 of a sensor 14 and includes an input interface 22, a setting unit 24, and an output interface 26. The device 16 according to example aspects of the invention can be, for example, integrated into a vehicle control unit and/or configured as part of a driver assistance system or implemented as a separate module. It is possible that the device 16 according to example aspects of the invention is partially or completely implemented in software and/or hardware. The various units and interfaces can be configured individually or in combination as a processor, a processor module, or software for a processor.

Sensor data 20 of a sensor 14 are received via the input interface 22. In particular, data of a radar or LIDAR sensor and/or of a camera can be received. For example, the input interface 22 can be connected to a vehicle bus system in order to receive the data of the sensor. Moreover, it is conceivable that the input interface 22 can receive map data that are provided by an onboard computer and/or by an external system. The map data can include, in particular, information about curves, uphill grades, speed limits, environmental zones, tunnels, and/or stops.

In the setting unit 24, a control distance is ascertained based on the sensor data 20, at which at least one property of the road section ahead of the vehicle 12 that is relevant for an open-loop control of the vehicle 12 changes. Such properties can be, for example, an uphill grade, a curve radius, a traffic rule, and/or objects 18 on the road section ahead of the vehicle 12. The setting unit 24 can set a support point in a discrete representation of the road section ahead of the vehicle 12, wherein the support point can correspond to the control distance. The setting unit 24 is also configured for setting a lower predefined second number n2 of support points based on a predefined first number n1 of support points. This can be carried out in a first pass. It is understood that the setting unit 24 can also be configured for performing multiple passes in order to set the predefined second number n2 of support points. Performing a pass is preferably to be understood as scanning and analyzing the individual support points step by step.

Via the output interface 26, a discrete representation 30 is output to an optimizer when the setting unit 24 has set the predefined second number n2 of support points. The discrete representation 30 can be output to an optimizer via a vehicle bus system. A vehicle control unit is also preferably connected to the bus system. The optimizer is configured for determining a profile of at least one control parameter for the open-loop control of a vehicle function based on the second number n2 of support points. Via the vehicle bus system, the optimizer can output the profile of the at least one control parameter in the form of a control command to a vehicle control unit of the vehicle 12, wherein the vehicle control unit then controls the vehicle functions according to the control command.

Figure 3:
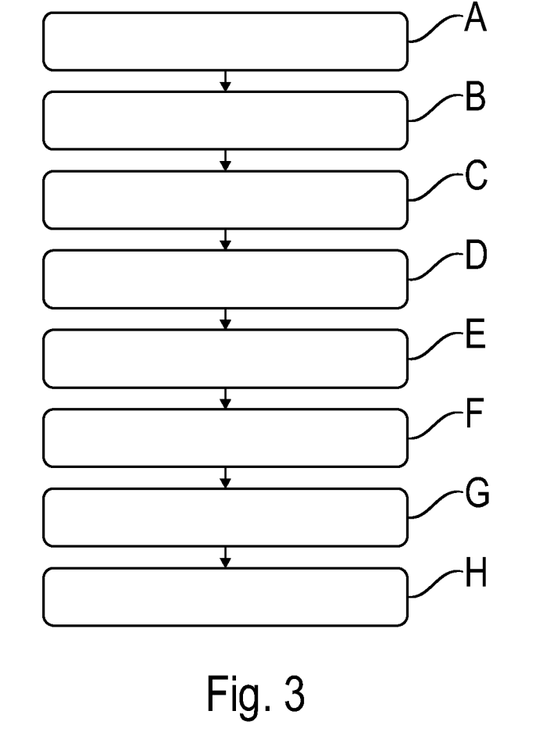
FIG. 3 diagrammatically shows a flow chart of individual steps, which can be carried out by a device according to example aspects of the invention.

FIG. 3 diagrammatically shows individual steps of a flow chart, which represents one possible setting of a predefined second number n2 of support points by the setting unit 24.

In a step A, for example, a support point is set at the originating point, i.e., at the current position of the vehicle 12. Moreover, one further support point is set at the end of the considered road section ahead of the vehicle 12.

In a step B, the speed limit is taken into account, wherein the setting unit 24 sets a support point at each point at which the speed limit changes. A changing speed limit can be detected, for example, due to an automated sign recognition. Moreover, it is conceivable that map material is stored with a stored permitted maximum speed and the setting unit determines a speed limit by comparing the current vehicle position with the stored map material.

In a step C, a support point is set for each static traffic element that absolutely must be visible for an optimization of a control parameter. For example, a support point is set at positions of traffic lights, intersections, pedestrian crossings, tunnels, underpasses, and/or stops.

In a step D, preceding objects 18, preferably motor vehicles, cyclists, and/or other road users, are taken into account and a support point is set at each control distance at which a preceding object 18 is located.

In a step E, a maximum speed in curves in the upcoming road section ahead of the vehicle 12 is taken into account. A maximum speed in curves results, for example, from a limitation of the maximum permitted lateral acceleration. In this step, point ranges of the digital representation 30 are analyzed. The size of these point ranges is preferably dependent on a distance from the vehicle 12. In particular, close ranges have a smaller subsection than more distant ranges. Within one range, the support points are ascertained, at which the maximum speed is lower due to the curve curvature than a maximum permitted speed due to traffic rules. If no such support point is found, a support point is not set in the discrete representation 30. If a support point having such properties is ascertained, it is set in the discrete representation 30. If multiple support points have this property, the support point is set, the maximum permitted cornering speed of which is minimal. Preferably, all other points are discarded.

In a step F, the altitude profile of the road section (route section) ahead of the vehicle 12 is taken into account. At each support point in the digital representation 30, the uphill grade as well as the altitude at this support point are considered. The altitude can be determined, for example, in relation to the current altitude of the vehicle 12. Preferably, each support point is passed through in ascending order, i.e., at an increasing distance from the vehicle 12, wherein the following logic is represented. If a point has already been set in the discrete representation 30, the uphill grade and altitude at this point are stored. If a support point has not been set and if a deviation between a most recently stored uphill grade and an uphill grade at a support point currently to be investigated is greater than a first threshold, or if a deviation between a most recently stored altitude and the altitude at the support point currently to be investigated is greater than a second predefined threshold, a support point is set in the discrete representation 30 and the uphill grade and altitude at this set support point are stored. In all other cases, a new support point is not set in the discrete representation 30. In other words, it is ensured in this step that a change of the uphill grade or altitude in the considered road section ahead of the vehicle 12 is taken into account and a sufficient number of support points is present in the digital representation 30. Moreover, if a sufficient number of support points is not present in the digital representation 30, at least one new support point is set in the digital representation 30.

In a step G, it is ensured that a maximum permitted support point distance is not exceeded. Preferably, a maximum permitted support point distance is defined as a function of a distance of the support point to be set from the vehicle 12. For example, it can be provided that, in an area up to one hundred meters (100 m) ahead of the vehicle 12, a new support point must be present at least after ten meters (10 m). Moreover, it can be provided, for example, that at distances of greater than one hundred meteres (>100 m) from the vehicle 12, a new support point must be present at least after fifty meters (50 m). If the above-defined requirement has not yet been met, a new support point is inserted in the discrete representation 30 between already existing support points. This insertion can be carried out multiple times, if necessary, until the above-defined criterion has been met. This method yields point spacings that are between one half of the maximum point spacing and the maximum point spacing.

It is understood that a new support point cannot necessarily be inserted in the center between two existing support points, but rather, starting from a first support point, one further support point can be set with the maximum point spacing. This yields a greater point spacing closer to the vehicle than at the end of the considered road section ahead of the vehicle 12.

If, after the step G has been performed, it should be possible to assign further support points from the predefined second number n2 of support points, these are preferably inserted between two points having the greatest point spacing.

In a step H, the profile of at least one parameter that is relevant for the open-loop control of the vehicle is calculated on the basis of the previously set support points. A parameter of this type can be, for example, a speed, an acceleration, a steering angle, or the like. Preferably, these values are stored together with the corresponding support points, allowing an optimizer to interpolate between these values in order to create a control command for a vehicle control unit, which enables an implementation of the control parameter profile by the vehicle control unit.

Upon performing the above-described routine, it can happen that all support points of the reduced predefined second number n2 of support points have already been assigned. In this case, a check is carried out with respect to a support point currently to be set to determine whether the support point to be set is situated before or after an already set support point that is situated farthest from the vehicle 12. If the support point currently to be set is situated before the farthest support point, the farthest support point is overwritten. If the support point currently to be set is situated after the farthest support point, the support point currently to be set is discarded. As a result, the considered road section ahead of the vehicle 12, which is represented by the discrete representation 30, is shortened.

If it should be possible to assign more points from the predefined reduced second number n2 of points, the steps B, C, and D can be expanded as follows. Not only can a support point be set at a location of the considered event, but rather one or multiple support point(s) can be set already before or after the aforementioned support point. Preferably, no additional information is represented by the additional points. These additional support points are utilized as support points for the optimizer, which can better form a control parameter profile due to the additional support points. One example thereof would be a reduction of the maximum permitted speed, for example, at a traffic sign. Due to the provision of one additional support point in the digital representation 30 before the reduction, the optimizer can select a speed at this point and, as a result, more precisely form the profile of the speed reduction.

Figure 4:
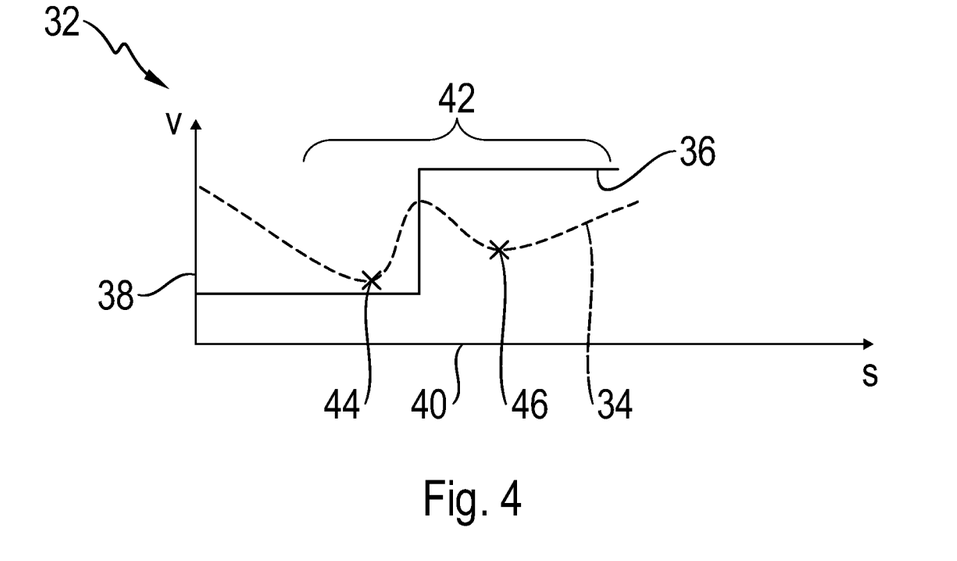
FIG. 4 diagrammatically shows a method for setting and discarding support points.

FIG. 4 schematically shows a diagram 32, which shows the profile of an ascertained vehicle speed 34 and the profile of a permitted speed 36. A speed is plotted on the y-axis 38 and a distance is plotted on the x-axis 40. The profile of the vehicle speed 34 and of the permitted speed 36 is considered in a subsection 42, which is represented by a curly bracket.

The profile of the vehicle speed 34 is modeled on the basis of a first support point 44 and a second support point 46. For example, the diagram can represent a profile of a cornering speed.

The first point 44 is determined on the basis of the maximum driveable cornering speed and has a speed that is higher than the permitted speed 36. This is apparent in the diagram due to the fact that the point 44 is located above the profile of the permitted speed 36. Driving at the speed represented by the point 44 therefore does not conform to traffic rules. Therefore, of the two support points 44 and 46 in the considered subsection 42, the support point 44 is discarded. The support point 46 also represents an ascertained cornering speed, wherein the ascertained cornering speed according to the support point 46 is below the permitted maximum speed 36. Consequently, the support point 46 is retained.

It is understood that the points 44 and 46 are selected merely by way of example. It can be the case, in particular, that multiple points are present for modeling the profile of the speed 34. For the sake of clarity, the representation was limited to two points in this example, however. The point 46 therefore represents the minimal vehicle speed 34 that is in the permitted speed range 36.

Figure 5:
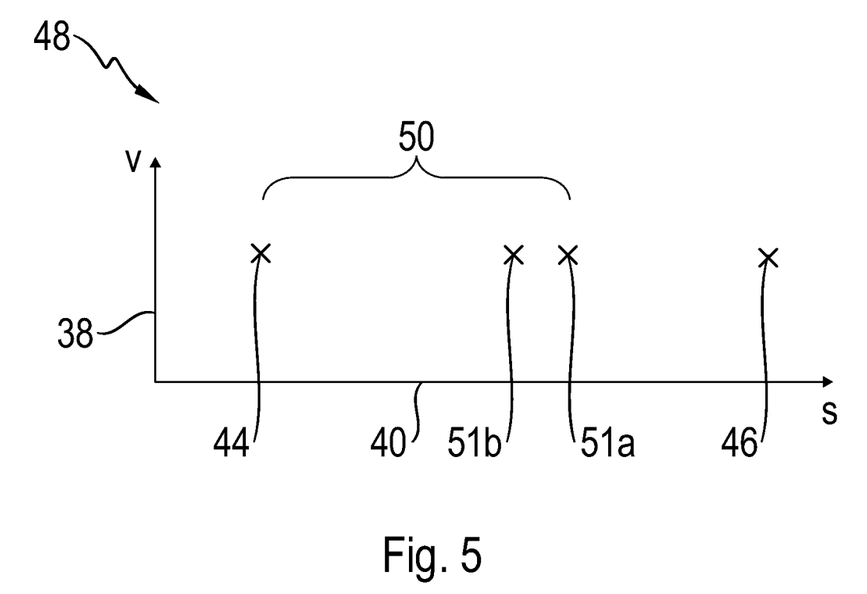
FIG. 5 shows a schematic of a method for setting a support point.

FIG. 5 shows one further diagram 48. As in FIG. 4, the speed is plotted on the y-axis 38 and the distance is plotted on the x-axis 40. The setting of additional support points is to be explained in the diagram 48. For this purpose, a maximum point spacing 50 is represented by a curly bracket. A spacing that is greater than the permitted maximum point spacing 50 is present between a first support point 44 and a second support point 46. Therefore, one further support point is to be set between the two support points 44, 46. This can take place, on the one hand, by setting one further support point 51a, which is set with the maximum point spacing 50 from the first support point 44. It is understood that one further support point 51b can also be set into the center between the two support points 44, 46.

Figure 6:
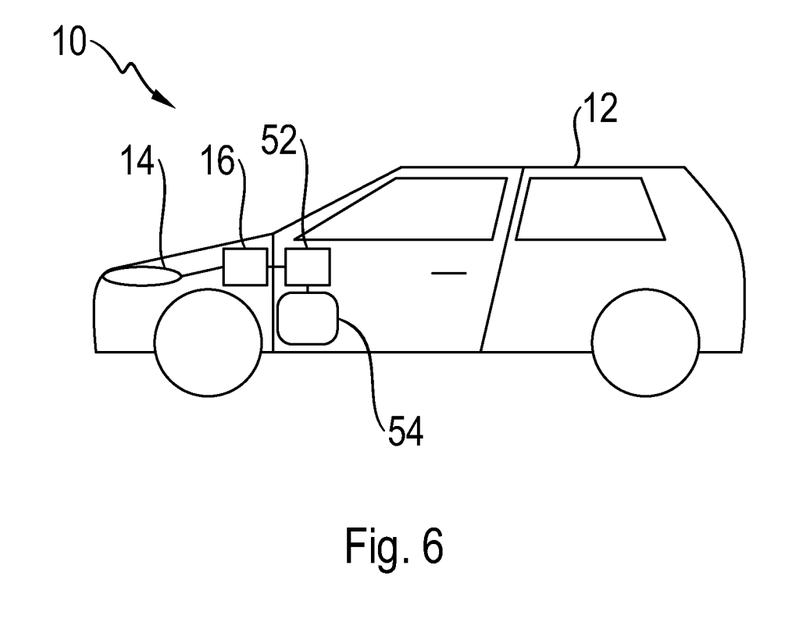
FIG. 6 shows a schematic of a system according to example aspects of the invention.

FIG. 6 diagrammatically shows a system 10 according to example aspects of the invention in a motor vehicle 12. The system 10 according to example aspects of the invention includes a sensor 14, a device 16 according to example aspects of the invention, an optimizer 52, and a vehicle control unit 54. The individual components of the system 10 are connected to one another, wherein a wireless connection as well as a hard-wired connection—preferably via a bus system of the vehicle 12—can be provided.

As described above, the device 16 receives sensor data of the sensor 14 and processes these in order to create a discrete representation 30 having a predefined second number n2 of support points. This discrete representation 30 is transmitted to the optimizer 52, which, on the basis of the support points, forms the profile of a control parameter for at least one vehicle function of the vehicle 12 and generates a control command corresponding to the profile and transmits this to the vehicle control unit 54. The vehicle control unit 54 then controls at least one vehicle function according to the control command of the optimizer 52.

Figure 7:
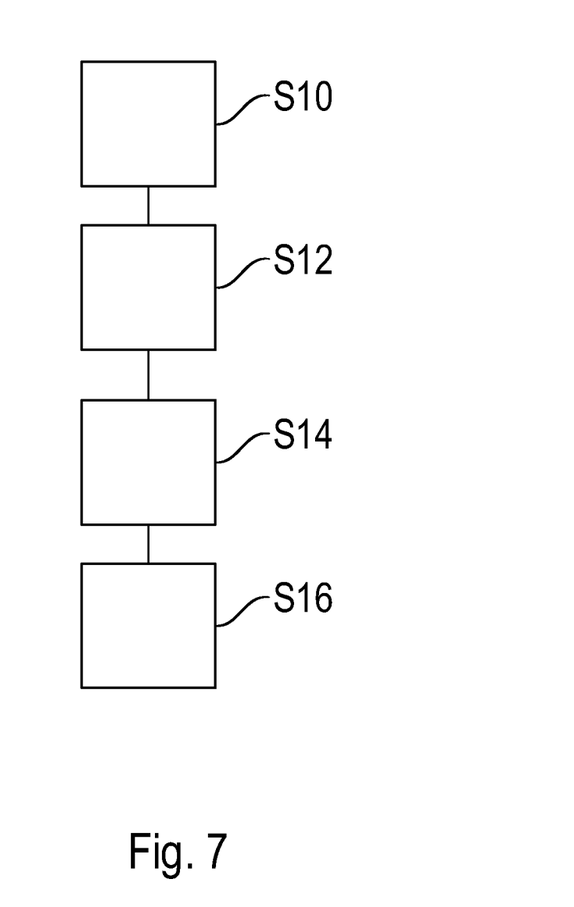
FIG. 7 shows a schematic of the individual steps of a method according to example aspects of the invention.

FIG. 7 diagrammatically shows the individual steps of a method according to example aspects of the invention for determining a discrete representation 30 of a vehicle section ahead of a vehicle 12. In a step S10, sensor data 20 of a sensor 14 including information about the road section ahead of the vehicle 12 are received. In a step S12, a control distance, at which a property of the road section ahead of the vehicle 12 that is relevant for an open-loop control of the vehicle changes, is ascertained based on the sensor data. In a step S14, a support point is set in a discrete representation 30 of the road section that corresponds to the control distance. The support point is set based on a predefined first number n1 of support points and a lower predefined second number n2 of support points. In a step S16, the lower predefined second number n2 of support points is output to an optimizer 52, wherein the optimizer 52 determines a profile of at least one control parameter for the open-loop control of a vehicle function based on the second number n2 of support points.

The invention was comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims.

In the claims, the words "comprise" and "comprising" do not rule out the presence of further elements or steps. The indefinite article "a" does not rule out the presence of a plurality. A single element or a single unit can carry out the functions of several of the units mentioned in the claims. An element, a unit, an interface, a device, and a system can be partially or completely converted into hardware and/or into software. The mere mention of a few measures in multiple various dependent claims is not to be understood to mean that a combination of these measures cannot also be advantageously utilized. A computer program can be stored/distributed on a non-volatile data carrier, for example, on an optical memory or on a solid state drive (SSD). A computer program can be distributed together with hardware and/or as part of a piece of hardware, for example, by the Internet or by hard-wired or wireless communication systems. Reference numbers in the claims are not to be understood as limiting.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 system
12 vehicle
14 sensor
16 device
18 object
20 sensor data
22 input interface
24 setting unit
26 output interface
30 discrete representation
32 diagram
34 vehicle speed
36 profile of the permitted speed 38 y-axis
40 x-axis
42 subsection
44 first support point
46 second support point
48 further diagram
50 maximum point spacing
52 optimizer
54 vehicle control unit
A-H steps of a flow chart
S10-S16 method steps of a method according to the invention
n1 first number
n2 second number

The invention claimed is:

1. A device (16) for determining a discrete representation (30) of a road section ahead of a vehicle (12), including:
an input interface (22) configured for receiving sensor data (20) of a sensor (14) including information about the road section ahead of the vehicle;
a setting unit (24) configured for ascertaining a control distance at which a property of the road section ahead of the vehicle that is relevant for an open-loop control of the vehicle changes based on the sensor data and for setting a support point in a discrete representation of the road section corresponding to the control distance, the setting unit configured for setting a lower predefined second number (n2) of support points based on a predefined first number (n1) of support points; and
an output interface (26) configured for outputting the lower predefined second number (n2) of support points to an optimizer (52) in order to determine a profile of at least one control parameter for the open-loop control of a vehicle function based on the second number (n2) of support points,
wherein the setting unit (24) is configured for setting support points that are situated closer to the vehicle (12) in the discrete representation (30) with a smaller point spacing than for more distant support points.

2. The device (16) of claim 1, wherein the setting unit (24) is configured for one or both of:
setting a support point in the discrete representation (30) for the control distance at which the property that is relevant for an open-loop control of the vehicle (12) includes a discrete event; and
setting a plurality of support points with a predefined maximum point spacing (50) in the discrete representation (30) for control distances at which the property that is relevant for an open-loop control of the vehicle (12) includes a continuous event.

3. The device (16) of claim 1, wherein the input interface (22) is configured for receiving map data from one or both of an onboard computer and an external system, wherein the map data comprises information about one or more of curves, uphill grades, speed limits, environmental zones, tunnels, and stops on the road section.

4. The device (16) of claim 1, wherein the setting unit (24) is configured for setting a first support point at an originating point of the discrete representation (30) and setting one further support point at an end point of the discrete representation (30).

5. The device (16) of claim 1, wherein the setting unit (24) is configured for setting a support point at each control distance at which the property that is relevant for the open-loop control of the vehicle (12) includes one or more of:
a change of the speed limit;
one or more of a static traffic element, a traffic light, a traffic sign, and an intersection;
a preceding object (18); and
one or more of a pedestrian crossing, a tunnel, an underpass, and a stop.

6. The device (16) of claim 1, wherein the setting unit (24) is configured for:
determining a predefined maximum cornering speed;
ascertaining, from a quantity of support points of the discrete representation (30), the support points at which a maximum cornering speed is less than a maximum permitted speed due to traffic rules; and
discarding all support points from the quantity of support points except for a support point at which the maximum cornering speed is minimal.

7. The device (16) of claim 1, wherein the setting unit (24) is configured for performing one further pass for setting support points and, based on the second number (n2) of support points, setting further support points and/or discarding support points.

8. The device (16) of claim 1, wherein the setting unit (24) is configured for:
ascertaining, at each support point from the first number (n1) of support points, both an uphill grade as well as an altitude at the respective support point;
investigating each support point from the first number (n1) of support points step-by-step in ascending order;
storing the uphill grade and the altitude at a support point from the second number (n2) of support points when the support point from the second number (n2) of support points has already been set in the discrete representation (30); and
when a deviation between a most recently stored uphill grade and a current uphill grade at a support point from the first number (n1) of support points is greater than a predefined threshold or a deviation between a most recently stored altitude and a current altitude as a support point from the first number (n1) of support points is greater than a further predefined threshold, setting a support point of the second number (n2) of support points in the discrete representation and storing an uphill grade and altitude at the support point of the second number (n2) of support points.

9. The device (16) of claim 1, wherein the setting unit (24) is configured for:
setting the support points in a predefined maximum point spacing (50) defined depending on a distance of the support points to the vehicle (12); and
between an already existing first support point and a second support point, setting a new support point in a center between the first support point and the second support point or starting from the first support point with the predefined maximum point spacing.

10. The device (16) claim 1, wherein the setting unit (24) is configured such that, when all support points from the second number (n2) of support points have been set, the setting unit (24) compares a distance of the support point currently to be set from the vehicle (12) with a distance of the support point farthest away from the vehicle and, of the two support points, setting the support point having the shorter distance to the vehicle.

11. The device (16) of claim 1, wherein the setting unit (24) is configured such that, when further support points from the second number (n2) of support points are settable, the setting unit (24) sets one further support point in the discrete representation (30) before and/or after a control distance at which the property that is relevant for the open-loop control of the vehicle (12) includes a discrete event.

12. A system (10) for determining a discrete representation (30) of a road section ahead of a vehicle (12), including:

a sensor (14) for generating sensor data (20) including information about the road section ahead of the vehicle;

the device (16) of claim 1;

an optimizer (52) for determining a profile of at least one control parameter for the open-loop control of a vehicle function based on the support points in the discrete representation; and a vehicle control unit (54) for the open-loop control of at least one vehicle function based on a control parameter profile determined by the optimizer.

13. A method for determining a discrete representation (30) of a road section ahead of a vehicle (12), comprising:

receiving (S10) sensor data (20) of a sensor (14) including information about the road section ahead of the vehicle;

ascertaining (S12) a control distance at which a property of the road section ahead of the vehicle that is relevant for an open-loop control of the vehicle changes, based on the sensor data;

setting (S14) a support point in a discrete representation of the road section corresponding to the control distance, wherein the support point is set based on a predefined first number (n1) of support points and a lower predefined second number (n2) of support points; and outputting (S16) the lower predefined second number (n2) of support points to an optimizer (52) in order to determine a profile of at least one control parameter for the open-loop control of a vehicle function based on the second number (n2) of support points, wherein the support points situated closer to the vehicle (12) in the discrete representation (30) have a smaller point spacing relative to more distant support points.

14. A computer program product, comprising program code for carrying out the method of claim 13 when the program code is run on a computer.

* * * * *